C. E. SOTHAN.
TRAP.
APPLICATION FILED DEC. 11, 1917.

1,264,703.

Patented Apr. 30, 1918.
2 SHEETS—SHEET 1.

Witnesses

Inventor
C. E. Sothan
By
Attorneys

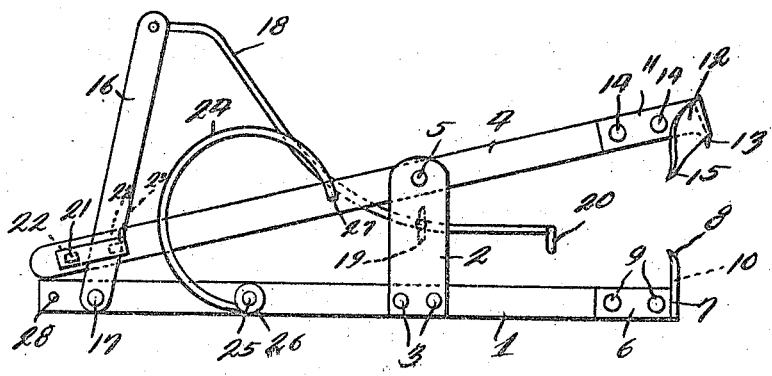
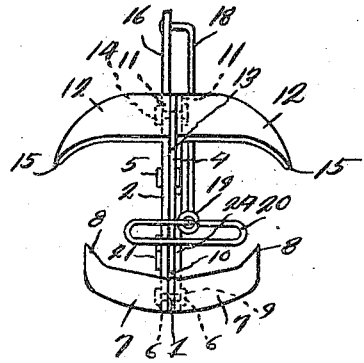
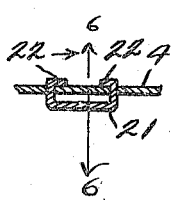

UNITED STATES PATENT OFFICE.

CARL E. SOTHAN, OF HALLAM, NEBRASKA.

TRAP.

1,264,703. Specification of Letters Patent. Patented Apr. 30, 1918.

Application filed December 11, 1917. Serial No. 206,585.

*To all whom it may concern:*

Be it known that I, CARL E. SOTHAN, a citizen of the United States, residing at Hallam, in the county of Lancaster, State of Nebraska, have invented a new and useful Trap; and I do hereby declare the following to be a full, clear, and exact description of the invention, such as will enable others skilled in the art to which it appertains to make and use the same.

The invention relates to improvements in traps.

One of its objects is to provide a device of this character which is particularly adapted for the trapping of rats, gophers and the like, the device being capable of having its jaws set and inserted in the rat or gopher home, so as to trap the animal as it approaches the outlet of the hole.

Another object of the invention is to provide a trap of this kind which cannot be drawn into the hole by the animal after the latter has been caught.

Still another object is to provide a trap, inexpensive and simple in construction and which will be comparatively free from the danger of inflicting injury upon the person engaged in setting the same.

Other objects will appear in the detailed description which follows.

It is to be understood that the invention is not to be confined to the exact construction herein disclosed, the right being reserved to make any changes or alterations falling within the scope of what is claimed.

In the drawings:

Fig. 3 is a side elevation of the trap with the jaws open. This elevation is taken on the opposite side of Fig. 1.

Fig. 4 is an end elevation of the device with the jaws open.

Fig. 5 is a detail sectional view showing the manner of mounting the strap in which the tripping lever moves.

Fig. 6 is a section on the line 6—6 of Fig. 5.

Figure 1:
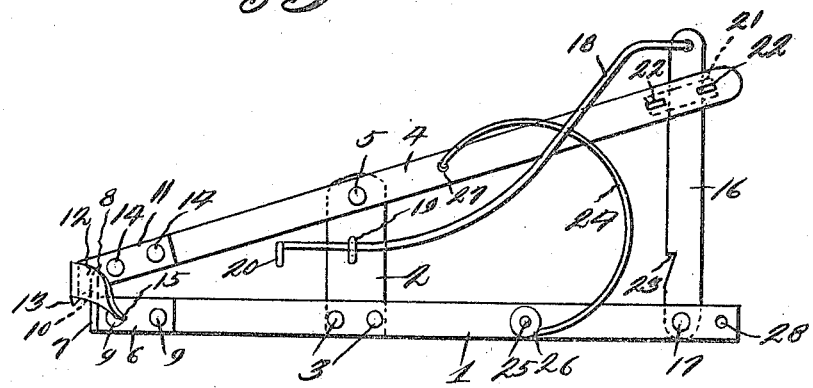
Figure 1 is a side elevation of the device closed.
Figure 2:
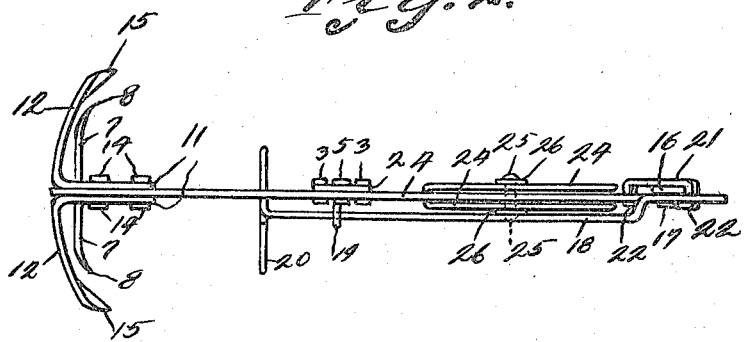
Fig. 2 is a top plan view of the device closed.

Referring to the drawings, 1 designates a bar rectangular in cross section, near whose longitudinal center a plate 2 is rigidly attached by means of rivets 3, this plate projecting laterally from the bar 1. A second bar 4 also rectangular in cross section is pivotally attached near its longitudinal center to the plate 2, a rivet 5 effecting the pivotal attachment close to the top of the plate 2. Both bars, on the same side of the plate 2 are provided with jaws at their ends. The jaw on the end of the bar 1 is formed of two angular plates each of which has a straight leg 6 of the same cross sectional area of the bar, the legs 7 of these plates lying in vertical planes at right angles to the planes of legs 6 but curving upward and having formed at their extremities and on their upper edge the triangular projections 8 which are designed as teeth. The two plates are connected to the bar 1 by means of rivets 9 which pass through the legs 6 and through the bar and rigidly secure both plates to the bar. At the extreme end of the bar 1, a tapered lateral projection 10 is formed which serves the purpose of a tooth.

The jaw formed at the end of the bar 4 also comprises two angular plates which are secured near the end of the bar by means of rivets 14 which pass through their straight legs 11 and through the bar. The legs 12 of these plates, however, curve back in the direction of the length of the bar and also turn downward terminating in tapered projections 15 which are designed as teeth. The extreme end of the bar 4 is provided with a tapered lateral projection 13, downwardly extending and also designed to act as a tooth.

Close to the end remote from that to which the jaw is attached, the bar 1 has pivotally connected to it the lever 16 which is loosely connected to the bar by means of the rivet 17, the lever at its upper end effecting a pivotal engagement with the arm 18 which bends downward and loosely passes through an eye 19 suitably attached on one face of the plate 2 slightly below the pivotal connection 5. The arm 18 is designed to be made of a circular rod or wire and terminates in a transverse oval loop 20 which depends toward the bar 1.

A sliding connection between the bar 4 and the lever 16 is effected by means of a strap 21 which straddles the lever cross wise and is secured to the bar by means of small extensions 22 which pass through holes formed in the bar and are bent down on the opposite side thereof. The extensions 22 are of less width than the body of the strap and the shoulders thus formed where the extensions adjoin the strap suffice to hold the strap spaced from the bar 4, so that a sliding engagement with the lever 16 may be easily effected. It will be noticed that the strap 21 is of such a length that pivotal movement of the lever 16 may also be obtained and the lever 16, on that edge facing the plate 2 and just above the pivotal connection 17, is provided with a notch 23. The notch 23 may engage the upper edge of the strap 21 when the rear ends of the bars 1 and 4 are brought together to separate the jaws on the front ends.

The jaws are held together normally by means of a spring 24. This spring comprises two arcuate legs, one attached on either side of the bar 1 and held in place by a rivet 25 and washers 26. The two legs straddle the bar 4 and are connected to the latter through the hole 27 and by the transverse portion which connects the two legs together.

The operation of the device is obvious from the foregoing description taken in conjunction with the drawings. The jaws are separated by bringing the rear ends of the bars 4 and 1 together and are retained in this separated position against the pressure of the spring 24 by the lever 16 whose notch 23 is made to engage the upper edge of the strap 21. The jaws will remain separated until a pressure is applied on the looped end 20 of the arm 18, when the notch 23 will be released from engagement with the strap 21, when the spring 24 will operate to close the jaw and, if the pressure on the arm 18 has been exerted by an animal standing between the jaws, the latter will be caught when they are closed by the spring.

It will be observed that the trap may be set at the end remote from the jaws by simply pressing the ends of the bars 1 and 4 together and effecting the engagement of the notch 23 with the strap 21. The accidental springing of the trap is, therefore, not likely to result in injury to the person engaged in setting it since it is unnecessary to handle the jaws in effecting the setting operation.

The device is designed particularly for the trapping of gophers and other predatory ground animals and is intended to be inserted in the hole of the animal with the jaws closed, and in which the jaws are set by bringing the rear ends of the bars 1 and 4 together as previously described. The jaws of the trap when opened in the hole press into the ground on the inside of the hole and are practically out of the way of the gopher who, in approaching the outlet of its hole, will run against the oval loop 20, causing the arm 18 to move the lever 16, releasing the bar 4 and permitting the jaws to close, thus catching the animal between the teeth of the two jaws.

By scraping the loose dirt of the mound away down to the hole the trap may be easily set in the dirt without the use of a spade.

The lever 16 is of greater height than the two jaws when they are open and, should an animal caught by the jaws be not killed or seriously disabled, it would be impossible for him to pull the trap into the hole, since the length of the lever 16 would preclude the entrance of the rear end of the trap into the hole.

The bar 1 close to its rear end is provided with a hole 28 by means of which it may have a chain attached to it, so that the trap may be anchored in case it is used in the open.

What is claimed is:

1. A trap comprising a stationary bar having a lateral projection near its longitudinal center, said stationary bar having a jaw formed at one end, a movable bar pivotally secured to the lateral projection, said movable bar also having a jaw formed at one end, a lever pivoted near the opposite end of the stationary bar, a strap secured to the opposite end of the movable bar in surrounding relation to the lever, the lever having a notch near its pivoted end adapted to be engaged by the strap, an arm pivotally connected with the free end of the lever and slidably supported on the lateral projection, said arm terminating in a depending oval loop portion extending transversely between the movable and stationary bars, and a spring means connected between the two bars and tending normally to keep the jaws together.

2. In a trap, a stationary bar provided with an upright between its ends, one end of the stationary bar having a transverse jaw having its lateral parts curved partially upwardly and terminating in points, a second bar fulcrumed on the upright above the stationary bar, one end of the fulcrumed bar having secured thereto plates provided with lateral parts curved downwardly laterally and rearwardly and terminating into points and constituting a movable jaw to coöperate with the first jaw, straps secured to the opposite end of the second bar, a lever pivoted to the stationary bar and having a notch to engage said strap, an arm pivotally connected with the free end of the lever and slidably supported on the upright, said arm terminating in a depending oval loop extending transversely between the movable and stationary bars, and spring means connected between the two bars and acting to normally keep the jaws together.

In testimony whereof I have signed my name to this specification in the presence of two subscribing witnesses.

CARL E. SOTHAN.

Witnesses:
FRED T. CARSTEN,
CHAS. F. BUCK.

Copies of this patent may be obtained for five cents each, by addressing the "Commissioner of Patents, Washington, D. C."